United States Patent
Yamanaka et al.

(10) Patent No.: US 9,050,566 B2
(45) Date of Patent: *Jun. 9, 2015

(54) GAS SEPARATION MEMBRANE

(71) Applicant: Central Glass Company, Limited, Ube-shi, Yamaguchi (JP)

(72) Inventors: Kazuhiro Yamanaka, Tachikawa (JP); Takeshi Suda, Fujimino (JP); Hiroki Uoyama, Saitama (JP)

(73) Assignee: Central Glass Company, Limited, Ube-shi (JP)

( * ) Notice: Subject to any disclaimer, the term of this patent is extended or adjusted under 35 U.S.C. 154(b) by 122 days.

This patent is subject to a terminal disclaimer.

(21) Appl. No.: 13/868,652

(22) Filed: Apr. 23, 2013

(65) Prior Publication Data

US 2014/0144324 A1  May 29, 2014

(30) Foreign Application Priority Data

Nov. 28, 2012 (JP) ................................. 2012-260190

(51) Int. Cl.
  *B01D 71/64* (2006.01)
  *B01D 53/22* (2006.01)
  *C08G 73/10* (2006.01)

(52) U.S. Cl.
  CPC .............. *B01D 71/64* (2013.01); *B01D 53/228* (2013.01)

(58) Field of Classification Search
  CPC ...... B01D 53/228; B01D 71/64; B01D 71/82; B01D 67/0093; B01D 2325/022; C08L 79/08; C08G 73/1071
  USPC ........... 96/4, 14; 95/45, 51, 53; 528/125, 172, 528/188, 353; 525/423, 434
  See application file for complete search history.

(56) References Cited

U.S. PATENT DOCUMENTS

| | | | |
|---|---|---|---|
| 3,133,132 A | 5/1964 | Loeb et al. | |
| 5,266,100 A | 11/1993 | Simmons | |
| 5,320,650 A * | 6/1994 | Simmons | 96/14 |
| 5,391,219 A * | 2/1995 | Matsumoto et al. | 95/51 |
| 5,647,894 A * | 7/1997 | Ohara et al. | 96/13 |
| 5,690,870 A | 11/1997 | Hachisuka et al. | |
| 2009/0292104 A1* | 11/2009 | Saegusa et al. | 528/331 |
| 2010/0029895 A1 | 2/2010 | Narizuka et al. | |
| 2011/0232484 A1* | 9/2011 | Yoshinaga et al. | 95/45 |

FOREIGN PATENT DOCUMENTS

| | | |
|---|---|---|
| JP | 63-190607 A | 8/1988 |
| JP | 3-274693 A | 12/1991 |
| JP | 4-93389 A | 3/1992 |
| JP | 5-194338 A | 8/1993 |
| JP | 7-132216 A | 5/1995 |
| JP | 8-501978 A | 3/1996 |

(Continued)

OTHER PUBLICATIONS

Kenichi Okamoto et al., "Polymer Application", 1992, p. 16, vol. 41, No. 1.
S. Alexander Stern, "Polymers for Gas Separations: The Next Decade", Journal of Membrane Science, 1994, pp. 1-65, vol. 94.
"Plastics-Film and Sheeting-Determination of Gas-Transmission Rate-Part 1: Differential—Pressure Method", Japanese Industrial Standard JIS, K 7126-1: 2006, pp. 1166-1173.
Co-pending U.S. Appl. No. 13/868,663, filed Apr. 23, 2013.
Co-pending U.S. Appl. No. 13/868,784, filed Apr. 23, 2013.
Co-pending U.S. Appl. No. 13/868,793, filed Apr. 23, 2013.
International Search Report including English translation dated Jan. 21, 2014 {Six (6) pages}.
Written Opinion (PCT/ISA/237) dated Jan. 21, 2014 {Four (4) pages}.

(Continued)

*Primary Examiner* — Jason M Greene
(74) *Attorney, Agent, or Firm* — Crowell & Moring LLP

(57) ABSTRACT

A gas separation membrane having a polyimide structure. The polyimide structure is provided to contain a repeating unit represented by general formula (1):

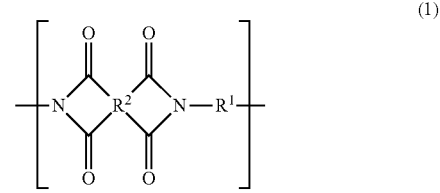

(1)

(In the formula, $R^1$ is a divalent organic group and $R^2$ is a tetravalent organic group),
wherein $R^1$ is a divalent organic group represented by general formula (2):

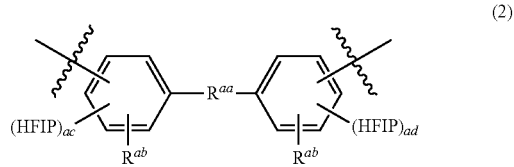

(2)

(In the formula, $R^{aa}$ is a single bond, an oxygen atom, a sulfur atom, —$SO_2$— group, —$CH_2$— group, —C(=O)— group, —C(CH$_3$)$_2$— group, —C(CH$_3$)(CH$_2$CH$_3$)— group, —C(CF$_3$)$_2$— group or a divalent organic group formed by removing any two hydrogen atoms from a $C_3$-$C_{12}$ alicyclic hydrocarbon or $C_6$-$C_{25}$ aromatic hydrocarbon. $R^{ab}$ is a $C_1$-$C_6$ alkyl group. "ac" and "ad" mutually independently represent an integer of 0 to 2 such that 1≤ac+ad≤4. HFIP represents a —C(CF$_3$)$_2$OH group. A straight line that intersects with a wiggly line represents a bonding moiety).

13 Claims, No Drawings

(56) References Cited

FOREIGN PATENT DOCUMENTS

| | | |
|---|---|---|
| JP | 8-173778 A | 7/1996 |
| JP | 11-343414 A | 12/1999 |
| JP | 2002-105034 A | 4/2002 |
| JP | 2007-119503 A | 5/2007 |
| JP | 2007-119504 A | 5/2007 |
| JP | 2008-150534 A | 7/2008 |
| JP | 2009-149787 A | 7/2009 |
| JP | 2009-235048 A | 10/2009 |
| JP | 2011-161396 A | 8/2011 |
| WO | WO 2012/165455 A1 | 12/2012 |

* cited by examiner

GAS SEPARATION MEMBRANE

BACKGROUND OF THE INVENTION

The present invention relates to a gas separation membrane.

From long ago, the separation of gas using a gas separation membrane has attracted attention as being a simple and facilitative technique capable of separating a mixture gas continuously while maintaining a gaseous state, the technique not involving a phase change. The separation of gas is a technique for selectively separating a gas with the aid of the presence or absence of permeation and the differences in permeation rate according to the kind of gas (hereinafter, sometimes referred to as gas) which is to permeate through a gas separation membrane.

As materials for the gas separation membrane, there have been known some polymers such as cellulose acetate, polysulfone, polyimide and the like. Of these, polyimide is known as a material having a strength suitable for being used for a gas separation membrane, resistant to breakage, and excellent in heat resistance so as to be usable at high temperatures.

Gas separation membranes using polyimide have variously been reported, in which the influence of the structure of a monomer on gas separation performances such as the permeability of the membrane for separating a target gas, the high selectivity about the target gas and the like is eagerly studied.

For example, it is known that a polyimide-based gas separation membrane containing a hexafluoroisopropylidene group (hereinafter, sometimes referred to as "a —C(CF$_3$)$_2$— group") in a repeating structure have high permeability of helium (hereinafter, sometimes referred to as "He") and carbon dioxide (hereinafter, sometimes described as "CO$_2$") and therefore the selectivity of these gases about oxygen (hereinafter, sometimes described as "O$_2$") and methane (hereinafter, sometimes referred to as "CH$_4$") is highly exhibited.

Additionally, in producing a gas separation membrane by introducing a —C(CF$_3$)$_2$— group into a repeating unit of polyimide, it is said possible to weaken the intermolecular interaction while enhancing the rigidity of the chains to cause a difference in permeability of a gas separation membrane according to the kind of gas thereby accomplishing both a high membrane permeability and a high selectivity (see Non-Patent Publications 1 and 2).

However, among materials for synthesizing a —C(CF$_3$)$_2$— group-containing polyimide, all that is easily usable is the following diamine and tetracarboxylic dianhydride. These are limited in chemical structure when developed into a polyimide membrane, so that it is difficult to design a chemical structure with consideration paid to the strength and separation performance as observed in use as a gas separation membrane.

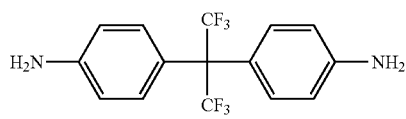

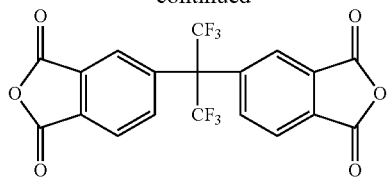

Furthermore, organic solvents into which polyimide is soluble are limited, which also serves as a problem.

In Patent Publications 1 to 3, a fluorine-containing polymerizable monomer for polymerizing a fluorine-containing polyimide, which is a diamine having 2-hydroxy-1,1,1,3,3,3-fluoroisopropyl group (hereinafter, sometimes referred to as "a —C(CF$_3$)$_2$OH group" or "a HFIP group") is disclosed together with a method for producing the same.

As a method for producing a gas separation membrane obtained from polyimide and the like, there are: a method of obtaining a uniform membrane by applying a polyimide solution in a wet condition and then only by evaporating a solvent; and a method of obtaining a nonuniform asymmetric membrane formed having a dense layer and a porous layer.

The method of obtaining an asymmetric membrane is exemplified by a method of discharging a polymer solution through an outlet and evaporating a solvent disposed in the vicinity of a surface in air to form a dense layer, in which method the surface is thereafter immersed in a coagulation bath charged with a coagulation liquid (which is a solvent compatible with the solvent for the polymer solution but not compatible with the polymer) thereby forming a finely porous layer in the coagulation bath. In Patent Publication 4, a method for producing a multilayer reverse osmosis membrane according to the above method is disclosed.

As discussed above, a diamine compound and tetracarboxylic dianhydride for polymerizing a (—C(CF$_3$)$_2$—) group-containing polyimide are limited in chemical structure when developed into a polyimide membrane, as discussed above, so that it is difficult to design a chemical structure with consideration paid to the formability, strength and separation performance of a gas separation membrane.

REFERENCES ABOUT PRIOR ART

Patent Publication

Patent Publication 1: Japanese Patent Application Publication No. 2007-119503
Patent Publication 2: Japanese Patent Application Publication No. 2007-119504
Patent Publication 3: Japanese Patent Application Publication No. 2008-150534
Patent Publication 4: U.S. Pat. No. 3,133,132

Non-Patent Publication

Non-Patent Publication 1: Kenichi OKAMOTO et al., Polymer Application, Vol. 41, No. 1, pp. 16, 1992
Non-Patent Publication 2: S. A. Stern, Journal of Membrane Science, Vol. 94, pp. 1, 1994

SUMMARY OF THE INVENTION

An object of the present invention is to provide a gas separation membrane which can overcome the above-mentioned drawbacks, soluble in an organic solvent, readily formable and excellent in gas separation performance when used as a gas separation membrane.

Means for Solving the Problems

The present inventors used a polyimide compound having a HFIP group (a polar group including —OH group) as a substituent and having an alkyl group as a substituent to provide the polyimide compound with a solubility in an organic solvent, and particularly a solubility in a polar solvent, and improved the gas separation performance by using the polyimide compound as a gas separation membrane, thereby achieving the completion of the present invention.

More specifically, the present invention is as follows.

[Invention 1]

A gas separation membrane, comprising:
a polyimide structure that contains a repeating unit represented by general formula (1):

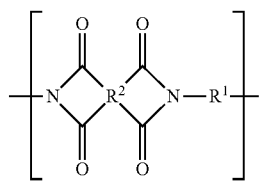

(1)

(In the formula, $R^1$ is a divalent organic group and $R^2$ is a tetravalent organic group),
wherein $R^1$ is a divalent organic group represented by general formula (2):

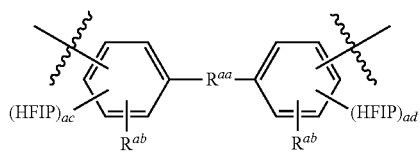

(2)

(In the formula, $R^{aa}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon. $R^{ab}$ is a $C_1$-$C_6$ alkyl group. "ac" and "ad" mutually independently represent an integer of 0 to 2 such that $1 \leq ac+ad \leq 4$. HFIP represents a —$C(CF_3)_2OH$ group. A straight line that intersects with a wiggly line represents a bonding moiety).

[Invention 2]

A gas separation membrane as discussed in Invention 1, wherein the divalent organic group represented by general formula (2) is a divalent organic group represented by general formula (3).

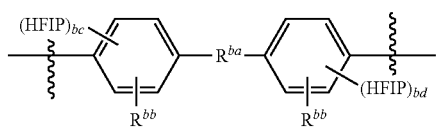

(3)

(In the formula (3), $R^{ba}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon. $R^{bb}$ is a $C_1$-$C_6$ alkyl group. "bc" and "bd" mutually independently represent an integer of 0 to 2 such that $1 \leq bc+bd \leq 4$. HFIP represents a —$C(CF_3)_2OH$ group. A straight line that intersects with a wiggly line represents a bonding moiety.)

[Invention 3]

A gas separation membrane as discussed in Invention 1, wherein the divalent organic group represented by general formula (2) is any one of divalent organic groups represented by general formulas (4) and (5).

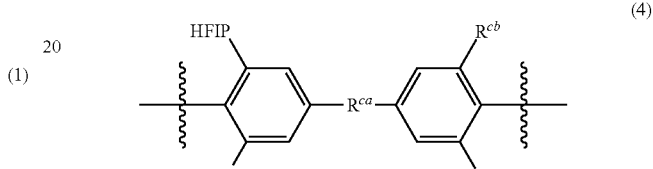

(4)

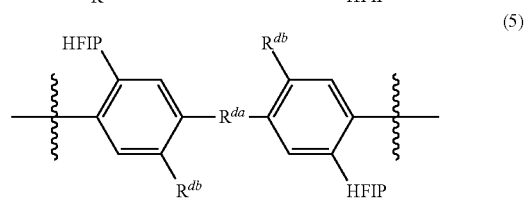

(5)

(In the formula (4), $R^{ca}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon. $R^{cb}$ is a $C_1$-$C_6$ alkyl group. HFIP represents a —$C(CF_3)_2OH$ group. A straight line that intersects with a wiggly line represents a bonding moiety.)

(In the formula (5), $R^{da}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon. $R^{db}$ is a $C_1$-$C_6$ alkyl group. HFIP represents a —$C(CF_3)_2OH$ group. A straight line that intersects with a wiggly line represents a bonding moiety.)

[Invention 4]

A gas separation membrane as discussed in Invention 1, wherein the divalent organic group represented by general formula (2) is any one of divalent organic groups represented by formulas (6) to (8).

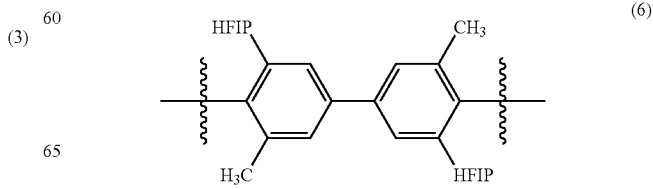

(6)

-continued

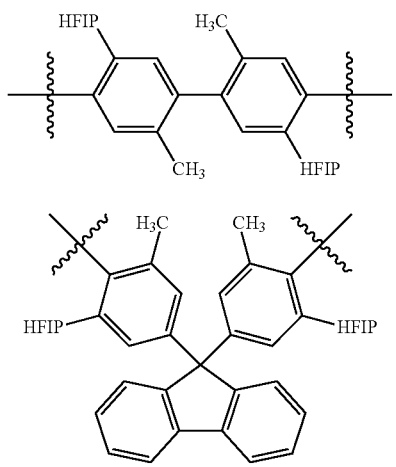

(7)

(8)

(In the formulas, HFIP represents a —C(CF$_3$)$_2$OH group. A straight line that intersects with a wiggly line represents a bonding moiety.)

[Invention 5]

A gas separation membrane comprising a polyimide structure, as discussed in any of Inventions 1 to 4, wherein R$^2$ is any one of tetravalent organic groups represented by formulas (9) to (14).

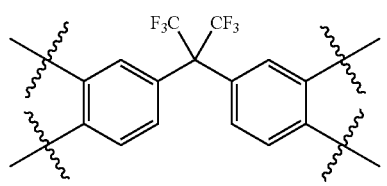

(9)

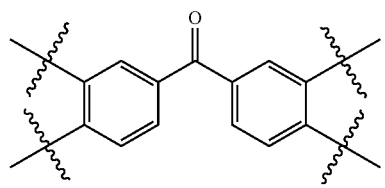

(10)

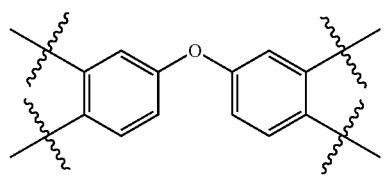

(11)

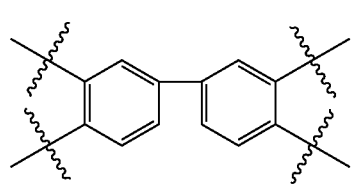

(12)

-continued

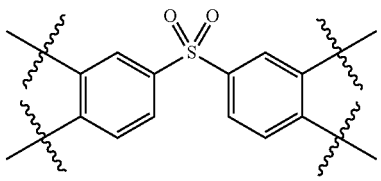

(13)

(14)

(In the formulas, a straight line that intersects with a wiggly line represents a bonding moiety.)

[Invention 6]

A gas separation membrane comprising a polyimide structure, as discussed in any of Inventions 1 to 5, wherein a hydrogen atom of —OH group that a HFIP group contained in R$^1$ has is substituted with a glycidyl group.

[Invention 7]

A gas separation membrane as discussed in Invention 6, wherein the glycidyl group forms crosslinking in a manner that its cyclic ether moiety is opened.

[Invention 8]

A gas separation membrane as discussed in any of Inventions 1 to 7, obtained by being mixed with an epoxy compound and then heated.

[Invention 9]

A gas separation membrane as discussed in Invention 8, wherein the epoxy compound is represented by general formula (15).

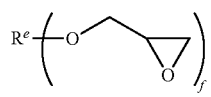

(15)

(In the formula, R$^e$ is an organic group having a valence of "f" and formed by removing any "f" hydrogen atoms from an alkane or an aromatic or alicyclic ring, and may contain an oxygen atom, sulfur atom or nitrogen atom in its structure, wherein a part of hydrogen atoms may be substituted with fluorine atom, chlorine atom, alkyl group or fluoroalkyl group. "f" is an integer of 1 to 4).

[Invention 10]

A polyimide comprising:
a repeating unit represented by general formula (1):

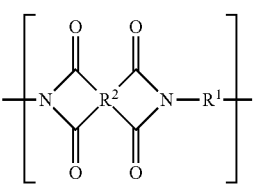

(1)

(In the formula, R$^1$ is a divalent organic group and R$^2$ is a tetravalent organic group), wherein $R^1$ is a divalent organic group represented by general formula (2):

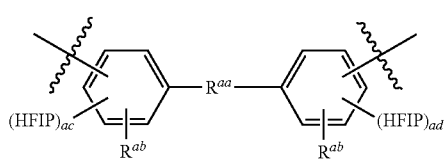

(2)

(In the formula, $R^{aa}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon. $R^{ab}$ is a $C_1$-$C_6$ alkyl group. "ac" and "ad" mutually independently represent an integer of 0 to 2 such that $1 \leq ac+ad \leq 4$. HFIP represents a —$C(CF_3)_2OH$ group. A straight line that intersects with a wiggly line represents a bonding moiety), and wherein a hydrogen atom of —OH group that a HFIP group contained in $R^1$ has is substituted with a glycidyl group.

[Invention 11]

A cured product comprising:
a polyimide having a glycidyl group, as discussed in Invention 10,
wherein the glycidyl group forms crosslinking in a manner that its cyclic ether moiety is opened.

[Invention 12]

A cured product comprising:
a polyimide as discussed in Invention 10; and
an epoxy compound,
wherein the cured product is obtained by mixing the polyimide with the epoxy compound and then by heating it.

[Invention 13]

A cured product as discussed in Invention 12, wherein the epoxy compound is represented by general formula (15):

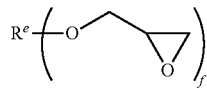

(15)

(In the formula, $R^e$ is an organic group having a valence of "f" and formed by removing any "f" hydrogen atoms from an alkane, aromatic compound or alicyclic compound, and may contain an oxygen atom, sulfur atom or nitrogen atom in its structure, wherein a part of hydrogen atoms may be substituted with fluorine atom, chlorine atom, alkyl group or fluoroalkyl group. "f" is an integer of 1 to 4).

Effects of the Invention

A polyimide-based gas separation membrane of the present invention, containing a HFIP group and an alkyl group exhibits an excellent separation performance derived from the HFIP group and the alkyl group. Additionally, the HFIP group has —OH group and therefore soluble in a specified organic solvent, and more particularly soluble in a polar solvent, so that it is possible to easily prepare a polyimide solution and to form it into a shape of a desired membrane.

Moreover, in a polyimide-based gas separation membrane of the present invention containing a HFIP group and an alkyl group, it is easy to introduce a HFIP group into an alkyl group-containing aromatic diamine provided as the starting material. With this, it becomes possible to design a structure superior to conventional fluorine-containing polyimide-based gas separation membrane not only in gas separation performance but also in membrane properties (e.g. the membrane strength and the swelling resistance in a solvent).

A gas separation membrane containing —$C(CF_3)_2$— group in addition to a HFIP group and an alkyl group exhibits a further excellent gas separation performance.

DETAILED DESCRIPTION OF THE INVENTION

Hereinafter the present invention will specifically be explained; however, the present invention is not limited by the following embodiments.

A monomer that serves as the starting material of polyimide containing a HFIP group and an alkyl group, for producing a gas separation membrane of the present invention, is exemplified by a HFIP group-containing diamine and a tetracarboxylic dianhydride. In order to ensure the strength of the gas separation membrane, it is preferable to adopt an aromatic diamine. In addition to an aromatic diamine containing a HFIP group and an alkyl group, it is also possible to add another diamine in order to adjust the strength and the separation performance of the membrane. Likely, for the purpose of adjusting the strength and the separation performance of the membrane, it is also possible to add another dicarboxylic acid or derivative thereof in addition to tetracarboxylic dianhydride.

1. Aromatic Diamine Containing HFIP Group and Alkyl Group

An aromatic diamine containing a HFIP group and an alkyl group, which serves as a monomer for synthesizing polyimide containing a HFIP group and an alkyl group for producing a gas separation membrane of the present invention, is represented by general formulas (2-A).

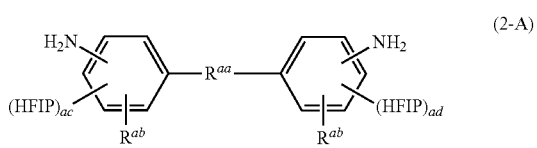

(2-A)

(In the formula, $R^{aa}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon. $R^{ab}$ is a $C_1$-$C_6$ alkyl group. "ac" and "ad" mutually independently represent an integer of 0 to 2 such that $1 \leq ac+ad \leq 4$. HFIP represents a —$C(CF_3)_2OH$ group.)

In an aromatic diamine (2-A) containing a HFIP group and an alkyl group, a divalent organic group formed by removing two hydrogen atoms from a $C_3$-$C_{12}$ alicyclic hydrocarbon is preferably exemplified by a divalent organic group formed by removing two hydrogen atoms from cyclohexane, bicyclohexane, adamantine or norbornane. A divalent organic group formed by removing two hydrogen atoms from a $C_6$-$C_{25}$ aromatic hydrocarbon is exemplified by a divalent organic group formed by removing two hydrogen atoms from benzene, biphenyl, naphthalene or fluorene. A $C_1$-$C_6$ alkyl group is exemplified by methyl group, ethyl group, propyl group, isopropyl group, n-butyl group, sec-butyl group and tert-butyl group.

An aromatic diamine (2-A) containing a HFIP group and an alkyl group is preferably a compound represented by formula (3-A):

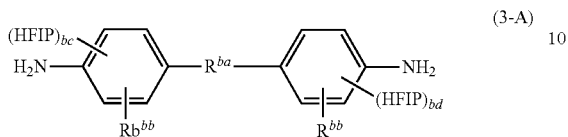
(3-A)

(In the formula (3), $R^{ba}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon. $R^{bb}$ is a $C_1$-$C_6$ alkyl group. "bc" and "bd" mutually independently represent an integer of 0 to 2 such that 1≤bb+bd≤4. HFIP represents a —$C(CF_3)_2OH$ group), and particularly preferably a compound represented by formula (4-A) or (5-A):

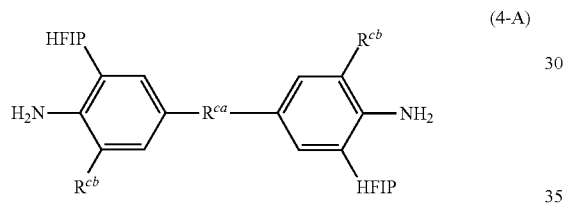
(4-A)

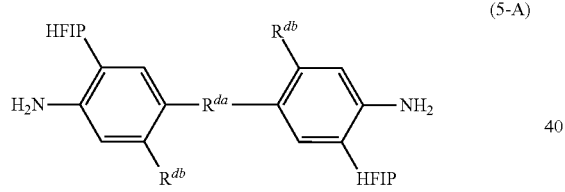
(5-A)

(In the formula (4-A), $R^{ca}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon. $R^{cb}$ is a $C_1$-$C_6$ alkyl group. HFIP represents a —$C(CF_3)_2OH$ group.)

(In the formula (5-A), $R^{da}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon. $R^{db}$ is a $C_1$-$C_6$ alkyl group. HFIP represents a —$C(CF_3)_2OH$ group.)

In the formula (4-A), a $C_1$-$C_6$ alkyl group represented by $R^{cb}$ is exemplified by methyl group, ethyl group, propyl group, isopropyl group, n-butyl group, sec-butyl group, tert-butyl group, pentyl group, hexyl group and the like.

A compound represented by formula (4-A) is concretely exemplified by compounds of formulas (4-1-A) to (4-22-A). Of these, a compound represented by formula (4-1-A), (4-10-A), (4-13-A), (4-17-A) or (4-21-A) is preferable in view of the availability of the starting material diamine.

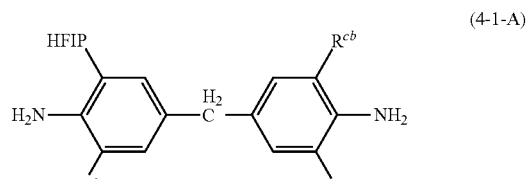
(4-1-A)

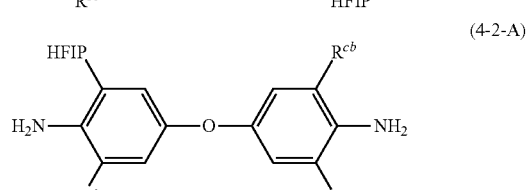
(4-2-A)

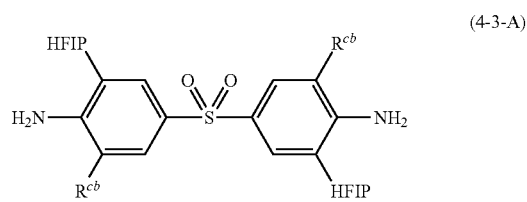
(4-3-A)

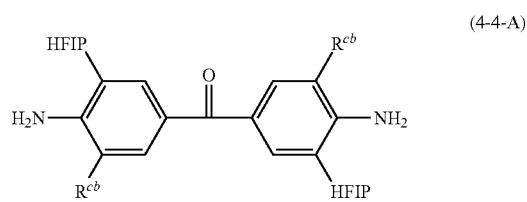
(4-4-A)

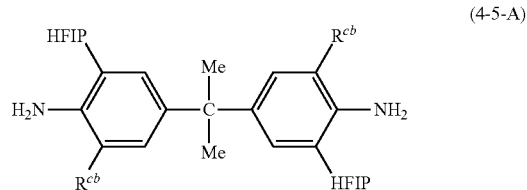
(4-5-A)

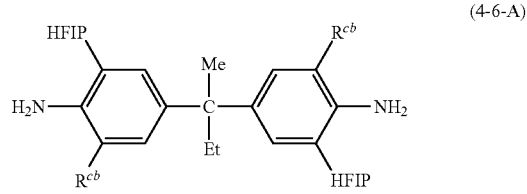
(4-6-A)

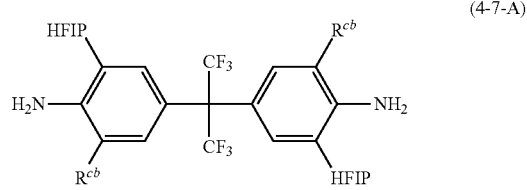
(4-7-A)

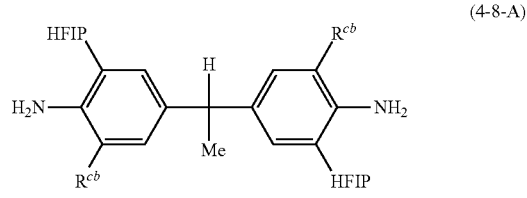
(4-8-A)

(4-9-A)
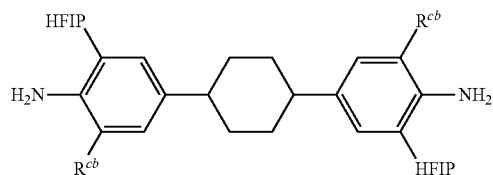

(4-10-A)
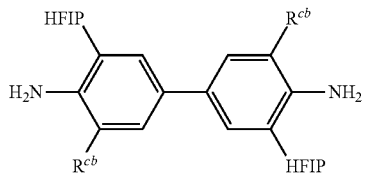

(4-11-A)
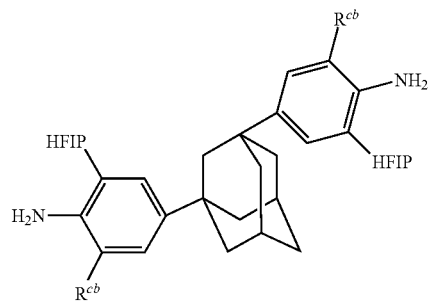

(4-12-A)
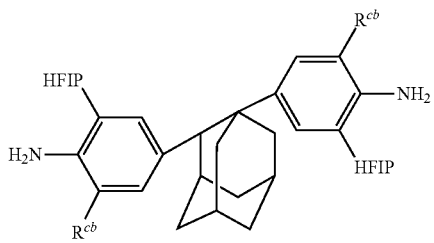

(4-13-A)
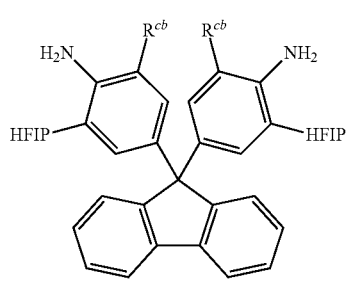

(4-14-A)
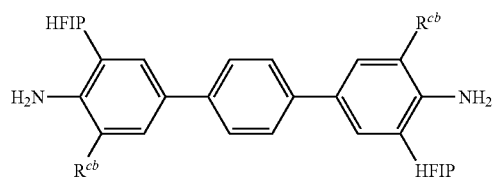

(4-15-A)
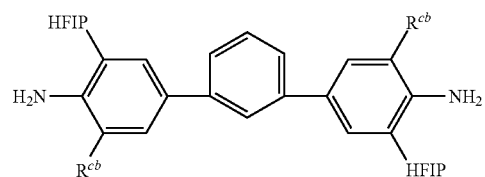

(4-16-A)
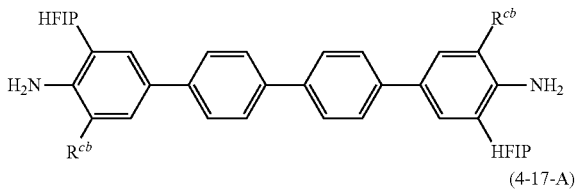

(4-17-A)
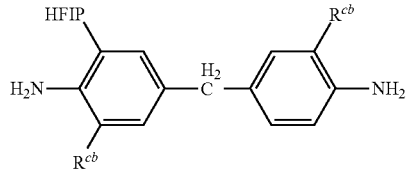

(4-18-A)
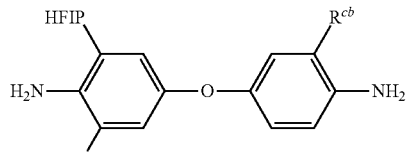

(4-19-A)
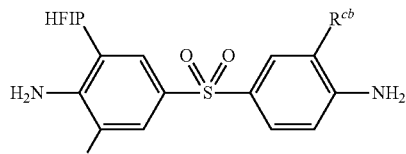

(4-20-A)
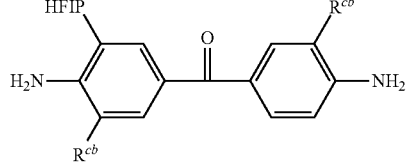

(4-21-A)
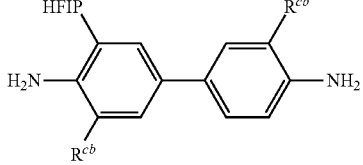

(4-22-A)
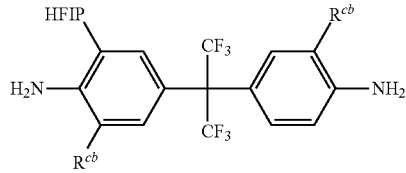

(In the formula, $R^{cb}$ is a $C_1$-$C_6$ alkyl group. HFIP represents a —$C(CF_3)_2OH$ group.)

In the formula (5-A), a $C_1$-$C_6$ alkyl group represented by $R^{db}$ is exemplified by methyl group, ethyl group, propyl group, isopropyl group, n-butyl group, sec-butyl group, tert-butyl group, pentyl group, hexyl group and the like.

A compound represented by formula (5-A) is concretely exemplified by compounds of formulas (5-1-A) to (5-22-A). Of these, a compound represented by formula (5-10-A) or (5-21-A) is preferable in view of the availability of the starting material diamine.

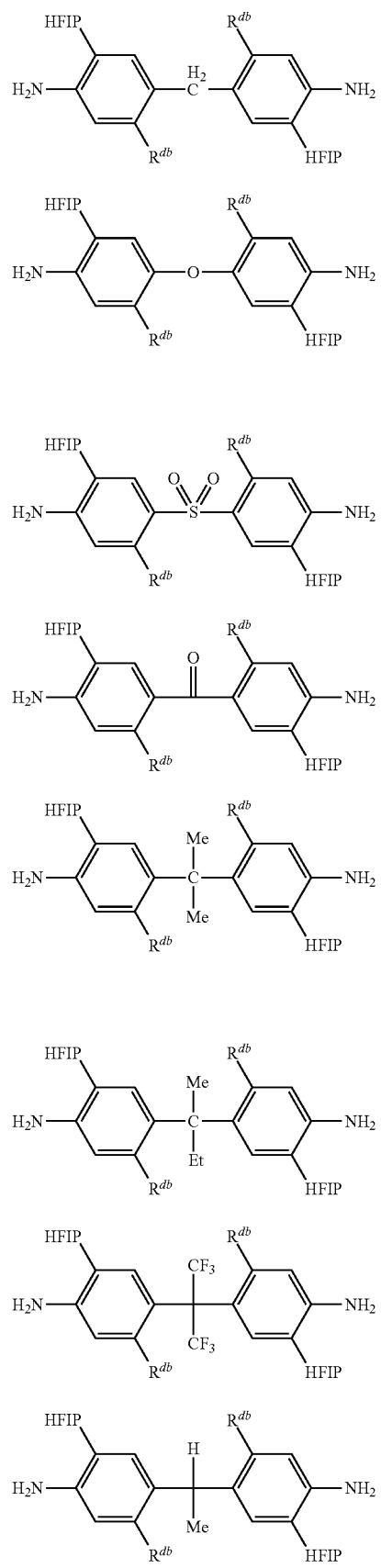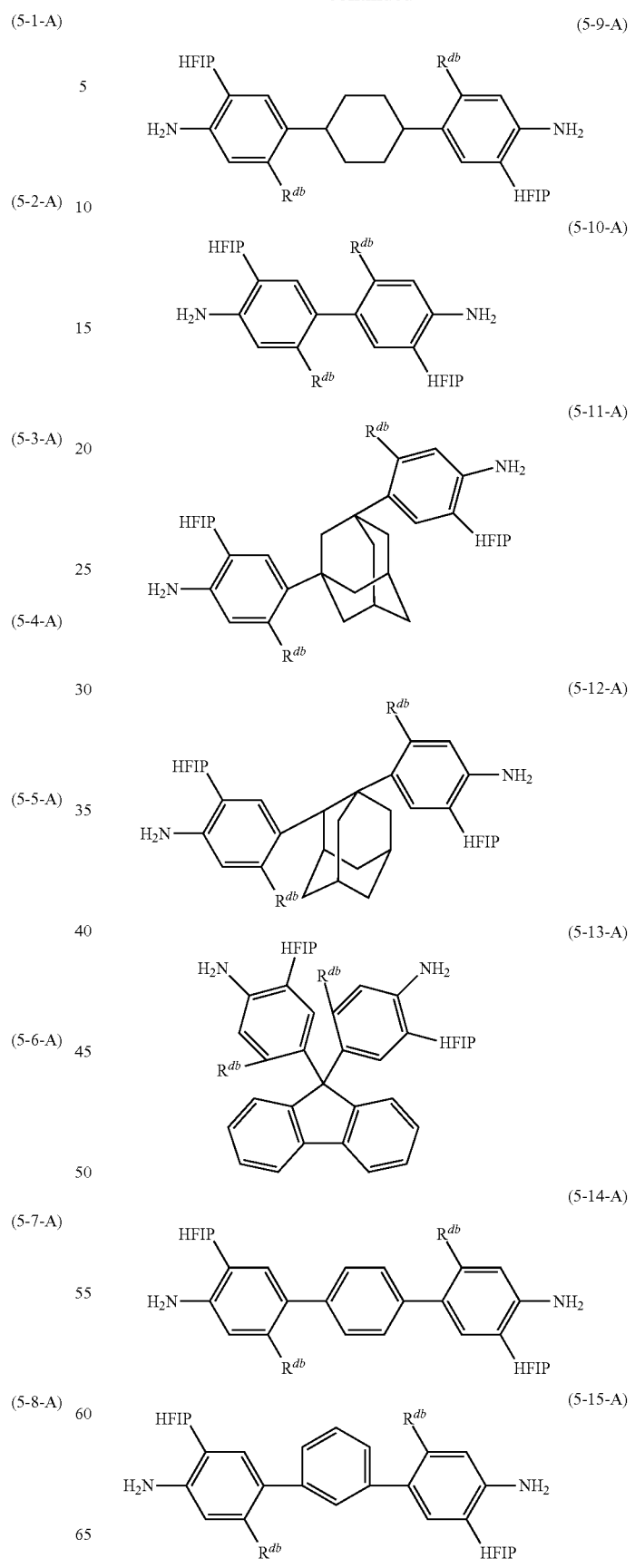

-continued

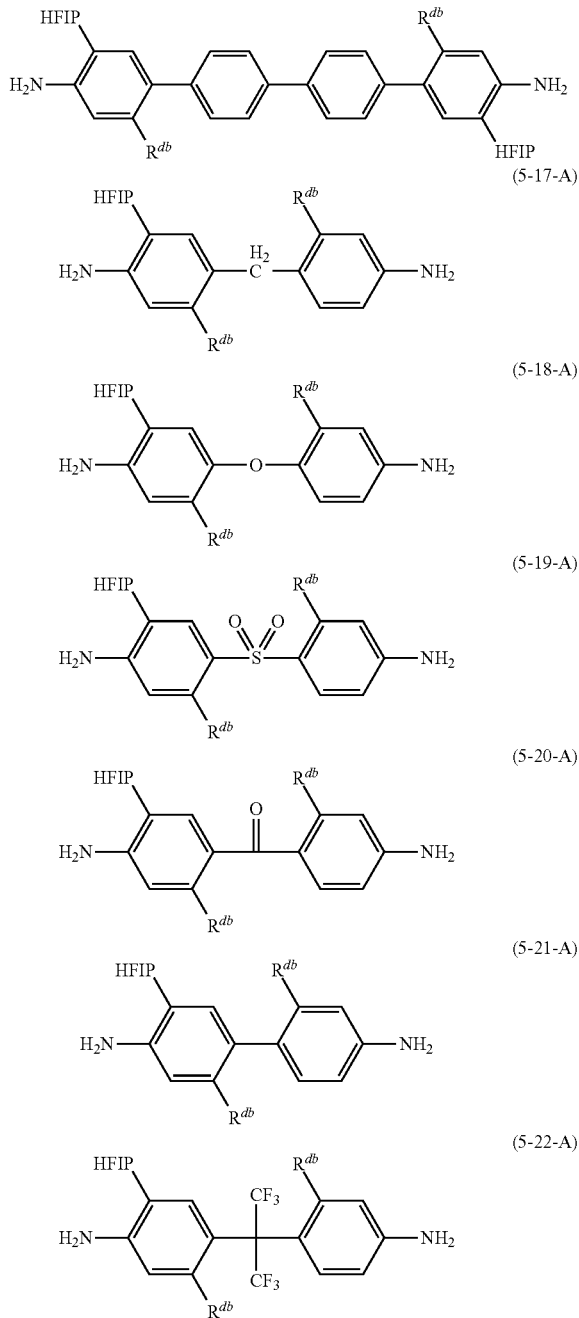

(In the formula, $R^{db}$ is a $C_1$-$C_6$ alkyl group. HFIP represents a —C(CF$_3$)$_2$OH group.)

These aromatic diamines containing a HFIP group and an alkyl group may be used in combination of two or more kinds.

These diamines are obtained through a reaction between an alkyl group-containing aromatic diamine and hexafluoroacetone or hexafluoroacetone trihydrate. As a method for producing the same, it is possible to apply methods discussed in Patent Publications 1 to 3 where an aromatic diamine having no alkyl group and hexafluoroacetone or hexafluoroacetone trihydrate is reacted.

2. Another Diamine

For the purpose of adjusting membrane properties such as gas separation performance, solubility in a polar solvent and membrane strength of the gas separation membrane, it is possible in the gas separation membrane of the present invention to use another diamine or dihydroxyamine in addition to the aromatic diamine containing a HFIP group and an alkyl group when polyimide having a HFIP group and an alkyl group is synthesized. The amount to be used is not smaller than 10 mol % and not larger than 80 mol %, preferably not smaller than 30 mol % and not larger than 60 mol % relative to the tetracarboxylic dianhydride.

Diamine is exemplified by 3,5-diaminobenzotrifluoride, 2,5-diaminobenzotrifluoride, 3,3'-bistrifluoromethyl-4,4'-diaminobiphenyl, 3,3'-bistrifluoromethyl-5,5'-diaminobiphenyl, bis(trifluoromethyl)-4,4'-diaminodiphenyl, bis(fluoroalkyl)-4,4'-diaminodiphenyl, dichloro-4,4'-diaminodiphenyl, dibromo-4,4'-diaminodiphenyl, bis(fluoroalkoxy)-4,4'-diaminodiphenyl, diphenyl-4,4'-diaminodiphenyl, 4,4'-bis(4-aminotetrafluorophenoxy)tetrafluorobenzene, 4,4'-bis(4-aminotetrafluorophenoxy)octafluorobiphenyl, 4,4'-binaphthylamine, o-phenylenediamine, m-phenylenediamine, p-phenylenediamine, 2,4-diaminotoluene, 2,5-diaminotoluene, 2,4-diaminoxylene, 2,4-diaminodurene, 1,4-xylylenediamine, dimethyl-4,4'-diaminodiphenyl, dialkyl-4,4'-diaminodiphenyl, dimethyl-diaminodiphenylmethane, 9,9-bis(4-aminophenyl)fluorene, 4,4'-diaminodiphenyl ether, 3,4'-diaminodiphenylether, 4,4'-diamino diphenyl sulfide, 3,4'-diaminodiphenylsulfide, 4,4'-diaminodiphenylsulfone, 3,3'-diaminodiphenylsulfone, 4,4'-diaminobenzophenone, 3,3'-diaminobenzophenone, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, bis(4-(3-aminophenoxy)phenyl)sulfone, bis(4-(4-aminophenoxy)phenyl)sulfone, 2,2-bis(4-(4-aminophenoxy)phenyl)propane, 2,2-bis(4-(4-aminophenoxy)phenyl)hexafluoropropane, 2,2-bis(4-(3-aminophenoxy)phenyl)propane, 2,2-bis(4-(3-aminophenoxy)phenyl)hexafluoropropane, 2,2-bis(4-(4-amino-2-trifluoromethylphenoxy)phenyl)hexafluoropropane, 2,2-bis(4-(3-amino-5-trifluoromethylphenoxy)phenyl)hexafluoropropane, 2,2-bis(4-aminophenyl)hexafluoropropane, 2,2-bis(3-aminophenyl)hexafluoropropane, 2,2-bis(3-amino-4-hydroxyphenyl)hexafluoropropane, 2,2-bis(3-amino-4-methylphenyl)hexafluoropropane, 4,4'-bis(4-aminophenoxy)octafluorobiphenyl or 4,4'-diaminobenzanilide. These may be used in combination of two or more kinds. Among these, it is preferable to use a diamine providing an obtained gas separation membrane with high permeability and containing —C(CF$_3$)$_2$— group, the diamine being represented by the following structural formula.

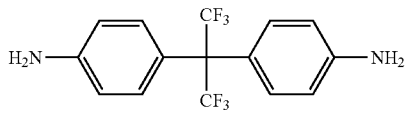

Furthremore, examples of dihydroxyamine are 3,3'-dihydroxybenzidine, 3,3'-diamino-4,4'-dihydroxybiphenyl, 4,4'-diamino-3,3'-dihydroxybiphenyl, 3,3'-diamino-4,4'-dihydroxydiphenylsulfone, 4,4'-diamino-3,3'-dihydroxydiphenylsulfone, bis(3-amino-4-hydroxyphenyl)methane, 2,2-bis(3-amino-4-hydroxyphenyl)propane, 2,2-bis(3-amino-4-hydroxyphenyl)hexafluoropropane, 2,2-bis(4-amino-3-hydroxyphenyl)hexafluoropropane, bis(4-amino-3-hydroxyphenyl)methane, 2,2-bis(4-amino-3- hydroxyphenyl)propane, 4,4'-diamino-3,3'-dihydroxybenzophenone, 3,3'-diamino-4,4'-dihydroxybenzophenone, 4,4'-diamino-3,3'-dihydroxydiphenylether, 3,3'-diamino-4,4'-dihydroxydiphenylether, 1,4-diamino-2,5-dihydroxybenzene, 1,3-diamino-2,4-dihydroxybenzene, and 1,3-diamino-4,6-dihydroxybenzene. These may be used in combination of two or more kinds. Among these, it is preferable to use a dihydroxyamine providing an obtained gas separation membrane with high permeability and containing —C(CF$_3$)$_2$— group, the dihydroxyamine being represented by the following structural formula.

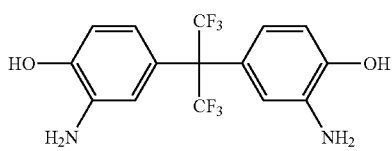 [SMILES: Nc1cc(C(c2ccc(O)c(N)c2)(C(F)(F)F)C(F)(F)F)ccc1O]

3. Tetracarboxylic Dianhydride

Tetracarboxylic dianhydride, which is used to synthesize polyimide containing a HFIP group and an alkyl group according to the present invention, is represented by general formula (16).

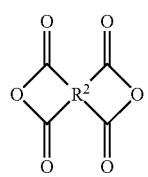

(16)

(In the formula, R$^2$ represents a tetravalent organic group.)

In the general formula (16), R$^2$ is preferably a tetravalent organic group formed by removing four hydrogen atoms from an alkane or an alicyclic or aromatic ring, and may contain a fluorine atom, chlorine atom, oxygen atom, sulfur atom or nitrogen atom in its structure, wherein a part of hydrogen atoms may be substituted with an alkyl group, fluoroalkyl group, carboxyl group, hydroxyl group or cyano group.

As the above-mentioned tetracarboxylic dianhydride, it is possible to concretely cite pyromellitic dianhydride (hereinafter, sometimes referred to as "PMDA"), trifluoromethylbenzenetetracarboxylic dianhydride, bistrifluoromethylbenzenetetracarboxylic dianhydride, difluorobenzenetetracarboxylic dianhydride, naphthalenetetracarboxylic dianhydride, biphenyltetracarboxylic dianhydride (hereinafter, sometimes referred to as "BPDA"), terphenyltetracarboxylic dianhydride, 3,3',4,4'-benzophenonetetracarboxylic dianhydride (hereinafter, sometimes referred to as "BTDA"), oxydiphthalic dianhydride (hereinafter, sometimes referred to as "ODPA"), bicycle[2,2,2]oct-7-ene-2,3,5,6-tetracarboxylic dianhydride, 2,2-bis(3,4-dicarboxyphenyl)hexafluoropropionic dianhydride (hereinafter, sometimes referred to as "6FDA"), 2,3,4,5-thiophenetetracarboxylic dianhydride, 2,5,6,2',5',6'-hexafluoro-3,3',4,4'-biphenyltetracarboxylic dianhydride, bis(3,4-dicarboxyphenyl)sulfonic dianhydride (hereinafter, sometimes referred to as "DSDA") and 3,4,9,10-perylenetetracarboxylic dianhydride. These tetracarboxylic dianhydride may be used singly or in combination of two or more kinds.

Of these, PMDA, BPDA, BTDA, DSDA, ODPA and 6FDA are particularly preferable in view of availability, and more specifically, 6FDA is further preferable because of having excellent gas separation performances (permeability and selectivity).

4. Dicarboxylic Acid and Dicarboxylic Acid Derivative

In order to adjust membrane properties for a gas separation membrane, such as separation performance, strength and the like, it is also possible to use a dicarboxylic acid or dicarboxylic acid derivative represented by general formula (17) or (18) in addition to the above-mentioned tetracarboxylic dianhydride. The amount to be used is not lower than 10 mol % and not more than 80 mol %, preferably not lower than 30 mol % and not more than 60 mol % relative to the tetracarboxylic dianhydride. Within this mole ratio range, adjustments of the gas separation performance, the solubility in a polar solvent and the membrane strength are allowed.

General Formula (17)

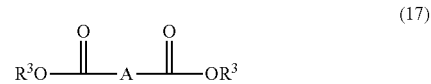

(17)

(In the formula (17), "A" represents an organic group and preferably a divalent organic group formed by removing two hydrogen atoms from alkane or an alicyclic or aromatic compound and may contain an oxygen atom or sulfur atom in its structure, wherein a part of hydrogen atoms may be substituted with alkyl group, fluorine, chlorine, fluoroalkyl group, carboxyl group, hydroxyl group or cyano group. R$^3$ mutually independently represents a hydrogen atom, C$_1$-C$_{10}$ alkyl group or benzyl group.)

General Formula (18)

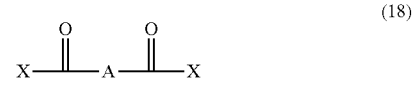

(18)

(In the formula (18), "A" represents an organic group and preferably a divalent organic group formed by removing two hydrogen atoms from alkane or an alicyclic or aromatic ring and may contain an oxygen atom, sulfur atom or nitrogen atom in its structure, wherein a part of hydrogen atoms may be substituted with alkyl group, fluorine, chlorine, fluoroalkyl group, carboxyl group, hydroxyl group or cyano group. "X" mutually independently represents a chlorine atom, fluorine atom, bromine atom or iodo atom.)

After condensation reaction, there is provided a structural unit containing a heterocyclic structure represented by general formula (19) as a copolymerized component.

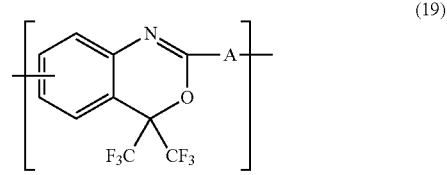

(19)

(In the formula, "A" represents an organic group and preferably a divalent organic group formed by removing two hydrogen atoms from alkane or an alicyclic or aromatic ring and may contain an oxygen atom, sulfur atom or nitrogen atom in its structure, wherein a part of hydrogen atoms may be substituted with alkyl group, fluorine, chlorine, fluoroalkyl group, carboxyl group, hydroxyl group or cyano group.)

A dicarboxylic acid or dicarboxylic acid derivative represented by general formula (18) or (19), for synthesizing a fluorine-containing polyimide used for producing a gas separation membrane of the present invention, can be exemplified in the form of dicarboxylic acid serving as the starting material, by: aliphatic dicarboxylic acids such as oxalic acid, malonic acid, succinic acid, glutaric acid, adipic acid, pimelic acid, suberic acid, azelaic acid and sebacic acid: aromatic carboxylic acids such as phthalic acid, isophthalic acid, terephthalic acid, 4,4'-dicarboxybiphenyl, 3,3'-dicarboxybiphenyl, 3,3'-dicarboxydiphenyl ether, 3,4'-dicarboxydiphenyl ether, 4,4'-dicarboxydiphenyl ether, 3,3'-dicarboxydiphenylmethane, 3,4'-dicarboxydiphenylmethane, 4,4'-dicarboxydiphenylmethane, 3,3'-dicarboxydiphenyldifluoromethane, 3,4'-dicarboxydiphenyldifluoromethane, 4,4'-dicarboxydiphenyldifluoromethane, 3,3'-dicarboxydiphenylsulfone, 3,4'-dicarboxydiphenylsulfone, 4,4'-dicarboxydiphenylsulfone, 3,3'-dicarboxydiphenylsulfide, 3,4'-dicarboxydiphenylsulfide, 4,4'-dicarboxydiphenylsulfide, 3,3'-dicarboxydiphenylketone, 3,4'-dicarboxydiphenylketone, 4,4'-dicarboxydiphenylketone, 2,2-bis(3-carboxyphenyl)propane, 2,2-bis(3,4'-dicarboxyphenyl)propane, 2,2-bis(4-carboxyphenyl)propane, 2,2-bis(3-carboxyphenyl)hexafluoropropane, 2,2-bis(3,4'-dicarboxyphenyl)hexafluoropropane, 2,2-bis(4-carboxyphenyl)hexafluoropropane, 1,3-bis(3-carboxyphenoxy)benzene, 1,4-bis(3-carboxyphenoxy)benzene, 1,4-bis(4-carboxyphenoxy)benzene, 3,3'-(1,4-phenylenebis(1-methylethylidene))bisbenzoic acid, 3,4'-(1,4-phenylenebis(1-methylethylidene))bisbenzoic acid, 4,4'-(1,4-phenylenebis(1-methylethylidene))bisbenzoic acid, 2,2-bis(4-(3-carboxyphenoxy)phenyl)propane, 2,2-bis(4-(4-carboxyphenoxy)phenyl)propane, 2,2-bis(4-(3-carboxyphenoxy)phenyl)hexafluoropropane, 2,2-bis(4-(4-carboxyphenoxy)phenyl)hexafluoropropane, bis(4-(3-carboxyphenoxy)phenyl)sulfide, bis(4-(4-carboxyphenoxy)phenyl)sulfide, bis(4-(3-carboxyphenoxy)phenyl)sulfone and bis(4-(4-carboxyphenoxy)phenyl)sulfone; perfluorononenyloxy group-containing dicarboxylic acids such as 5-(perfluorononenyloxy)isophthalic acid, 4-(perfluorononenyloxy)phthalic acid, 2-(perfluorononenyloxy)terephthalic acid and 4-methoxy-5-(perfluorononenyloxy)isophthalic acid; and perfluorohexenyloxy group-containing dicarboxylic acids such as 5-(perfluorohexenyloxy)isophthalic acid, 4-(perfluorohexenyloxy)phthalic acid, 2-(perfluorohexenyloxy)terephthalic acid, 4-methoxy-5-(perfluorohexenyloxy)isophthalic acid and 2,2'-di-trifluoromethyl-4,4'-dicarboxybiphenyl. These may be used in combination of two or more kinds.

5. Synthesis of Polyimide containing HFIP Group and Alkyl Group

A method of synthesizing polyimide that contains a HFIP group and an alkyl group, used for a gas separation membrane of the present invention will be discussed.

Hereinafter, an expression of "a dicarboxylic acid (derivative)" means "a dicarboxylic acid or dicarboxylic acid derivative". The same applies to the following in this specification.

As a method for synthesizing polyimide containing a HFIP group and an alkyl group, used for a gas separation membrane of the present invention, it is possible to cite methods absolutely requiring the above-mentioned aromatic diamine (that contains a HFIP group and an alkyl group) and tetracarboxylic dianhydride, in which methods another diamine and a dicarboxylic acid (derivative) may be added as needed and then these are dissolved in each other at 150° C. or more with no solvent to be reacted or these are brought into polymerization reaction at a reaction temperature of −20 to 80° C. in the presence of an organic solvent. In polymerization reaction, diamine and carboxylic dianhydride or dicarboxylic acid (derivative) is reacted at a mole ratio of 1:1, so that it is preferable that the abundance ratio of an aromatic diamine that has a HFIP group and an alkyl group and another diamine to tetracarboxylic dianhydride and dicarboxylic acid (derivative) falls at a mole ratio (aromatic diamine and another diamine:tetracarboxylic dianhydride and dicarboxylic acid (derivative)) of 1:1.

An organic solvent usable in the above-mentioned polymerization reaction is required only to be one that can dissolve the substrate and exemplified by: amide-based solvents such as N,N-dimethylformamide, N,N-dimethylacetamide, hexamethylphosphoric triamide and N-methyl-2-pyrrolidone; aromatic solvents such as benzene, anisole, diphenyl ether, nitrobenzene and benzonitrile; halogen-based solvents such as chloroform, dichloromethane, 1,2-dichloroethane and 1,1,2,2-tetrachloroethane; and lactones such as γ-butyrolactone, γ-valerolactone, δ-valerolactone, γ-caprolactone, ε-caprolactone and α-methyl-γ-butyrolactone. These organic solvents may coexist with an acid acceptor (e.g., pyridine and triethylamine) to cause polymerization reaction.

A polyamic acid containing a HFIP group and an alkyl group, obtained through the above-mentioned polymerization reaction is brought into a dehydration cyclization reaction to form imide thereby achieving the conversion into the target compound (i.e., polyimide containing a HFIP group and an alkyl group).

The dehydration cyclization reaction is conducted under such a reaction condition (including a heating condition, use of an acid catalyst and the like) as to accelerate the cyclization. In general, a solution of polyamic acid containing a HFIP group and an alkyl group, obtained immediately after polymerization reaction, is imidized at a high temperature of not lower than 150° C. and not higher than 250° C. thereby allowing a preparation of a solution of polyimide containing a HFIP group and an alkyl group. At this time, pyridine, triethylamine, acetic anhydride or the like may be added thereto. The concentration of polyimide containing a HFIP group and an alkyl group in the solution is preferably not smaller than 5 mass % and not larger than 50 mass %. When the concentration is smaller than 5 mass %, polyimide is so poor as not to be industrially practical. Meanwhile, a polyimide of larger than 50 mass % is difficult to be dissolved. The concentration is more preferably not smaller than 10 mass % and not larger than 40 mass %.

Polyimide containing a HFIP group and an alkyl group, according to the present invention preferably has a weight-average molecular weight (hereinafter, sometimes referred to as "Mw") of not lower than 10,000, more preferably not lower than 20,000. An upper limit of the weight-average molecular weight is preferably not higher than 500,000, more preferably not higher than 300,000. When the weight-average molecular weight is lower than 10,000, the strength of a polymer membrane to be obtained is poor. When the weight-average molecular weight exceeds 500,000, a polymer solution to be obtained becomes so high in viscosity as to be hard to handle. A weight-average molecular weight discussed in this specification is calculated as a value converted with respect to polystyrene standard by gel permeation chromatography (hereinafter, sometimes referred to as "GPC") (The same applies to the present application). Conditions for the above-mentioned analysis will specifically be discussed in Examples of the present application.

6. Preparation of Solution of Polyimide Containing HFIP Group and Alkyl Group

The thus obtained solution of polyimide containing a HFIP group and an alkyl group may be used for production of a gas separation membrane as it is. Additionally, for the purpose of removing a remaining monomer or oligomer contained in the solution of polyimide containing a HFIP group and an alkyl group, the solution of polyimide containing a HFIP group and an alkyl group may be added to a poor solvent such as water and alcohol to precipitate the polyimide containing a HFIP group and an alkyl group and then subjected to isolation purification and then dissolved in an organic solvent again thereby being prepared.

A usable organic solvent is required only to be one that can dissolve polyimide containing a HFIP group and an alkyl group therein, so that it is possible to use one selected from: amide-based solvents such as N,N-dimethylformamide, N,N-dimethylacetamide, N,N-dimethylformamide, hexamethylphosphoric triamide and N-methyl-2-pyrrolidone; aromatic solvents such as benzene, anisole, diphenyl ether, nitrobenzene and benzonitrile; halogen-based solvents such as chloroform, dichloromethane, 1,2-dichloroethane and 1,1,2,2-tetrachloroethane; lactones such as γ-butyrolactone, γ-valerolactone, δ-valerolactone, γ-caprolactone, ε-caprolactone and α-methyl-γ-butyrolactone; phenols such as phenol, cresol, xylenol, catechol and chlorophenol; and mixture solvents of these.

7. Production of Gas Separation Membrane

A gas separation membrane formed from polyimide containing a HFIP group and an alkyl group, according to the present invention may be either a uniform membrane obtained by a wet film forming method where a thin membrane is produced with the aid of the property of a solvent evaporating from a solution of polyimide containing a HFIP group and an alkyl group, or an asymmetric membrane obtained by other method to have a dense layer and a porous layer.

[Uniform Membrane]

A uniform membrane is obtained in such a manner as to apply the above-mentioned solution of polyimide containing a HFIP group and an alkyl group to a substrate (a glass substrate or the like) by a spin coater, applicator or the like in a wet condition and then heat the substrate in a dried gas such as air, nitrogen and argon to evaporate a solvent and then peel a membrane from the substrate. The uniform membrane can be obtained also by using a polyamic acid solution containing a HFIP group and an alkyl group instead of the polyimide solution containing a HFIP group and an alkyl group, in which method the polyamic acid solution is applied to a substrate according to the above-mentioned procedures and then heated to be imidized.

For using the uniform membrane as a gas separation membrane, the thickness of the uniform membrane is preferably not less than 5 μm and not more than 1 mm. A membrane of 5 μm or less thickness is difficult to be manufactured and easily broken. A membrane of 1 mm or more thickness has difficulty in permeating gases. The thickness is more preferably 10 to 200 μm.

[Asymmetric Membrane]

An asymmetric membrane formed having a dense layer and a porous layer can be formed by the above-mentioned method. Additionally, the asymmetric membrane can be obtained also by using a polyamic acid solution instead of the polyimide solution, in which an asymmetric membrane is formed and then heated to be imidized.

In the asymmetric membrane, the dense layer has different permeation rates according to the kind of gas so as to exhibit a selective gas separation function against a mixture gas. On the other hand, the porous layer functions as a support member for maintaining the shape of the membrane.

An asymmetric membrane to be used as the gas separation membrane of the present invention and formed including polyimide that contains a HFIP group and an alkyl group may have either a smooth shape or a hollow fiber shape.

A dense layer preferably has a thickness of not less than 10 nm and not more than 10 μm. When the thickness is less than 10 nm, the layer is difficult to be formed and therefore not practical. When the thickness is more than 10 μm, permeation of gas becomes difficult. The thickness is more preferably not less than 30 nm and not more than 1 μm.

A porous layer having the shape of a smooth layer preferably has a thickness of not less than 5 μm and not more than 2 mm. When the thickness is less than 5 μm, the layer is difficult to be formed and therefore not practical. When the thickness is more than 2 mm, permeation of gas becomes difficult. The thickness is more preferably not less than 10 μm and not more than 500 μm. In the case of the shape of hollow fiber, the internal diameter is not less than 10 μm and not more than 4 mm, preferably not less than 20 μm and not more than 1 mm. The outer diameter is not less than 30 μm and not more than 8 mm, preferably not less than 50 μm and not more than 1.5 mm. In the case of the shape of hollow fiber, it is preferable that the dense layer is disposed outside.

As a coagulation liquid used at the time of producing the asymmetric membrane, water or a mixture solvent of water and an organic solvent is preferably used. The mixture solvent contains water in an amount of 40 mass % or more, preferably 50 mass % or more. The organic solvent is exemplified by alcohols such as methanol, ethanol and isopropanol and ketones such as acetone, methyl ethyl ketone and diethyl ketone. If water or a water mixture solvent is used as a coagulation liquid, the manufacturing facility is not required to be exprosion-proof one and therefore results in cost reduction.

[Coagulation Liquid]

Polyimide containing a HFIP group and an alkyl group, used for the gas separation membrane of the present invention is particularly easily dissolved in amide-based solvents such as N,N-dimethylacetamide, N,N-dimethylformamide and N-methyl-2-pyrrolidone and lactones such as γ-butyrolactone and γ-valerolactone by virtue of the effect of the contained HFIP group (i.e., polar group), in which it is easy to produce a uniform membrane having a desired thickness and it is easy to produce an asymmetric membrane by using a water-based coagulation liquid.

Particularly, in manufacturing an asymmetric membrane, a desired dense layer can be produced by changing the distance between an outlet and a coagulation bath (or by simultaneously discharging a dried air, a water-based coagulation liquid or the like into the inside of the outlet, in the case of discharging the polymer into the shape of hollow fiber). By modifying the kind of the organic solvent in the coagulation bath, it becomes possible to form a porous layer having desired pore diameter, pore distribution and thickness.

A membrane treated with a coagulation liquid is preferably used after being dried by heat treatment. The temperature of heat treatment is preferably not higher than the glass transition temperature of polyimide in order not to cause melting.

[Silicone Resin Coating]

For the purpose of repairing surface defects on the produced gas separation membrane, a silicone resin may be coated on the surface of the separation membrane. As a coating method, known coating methods such as spin coating, coating by an applicator, immersion coating and the like are usable.

A silicone resin is exemplified by generally known silicones such as dimethyl silicone, a phenyl group-containing silicone, a vinyl group-containing silicone, a Si—H group-containing silicone, a trifluoropropyl group-containing silicone, a silanol group-containing silicone, an amino group-containing silicone, an epoxy group-containing silicone, a methacrylic groups-containing silicone, an acrylic group-containing silicone and the like. These are commercially available and exemplified by DMS series, PDV series, VDT series, series, FMV series, HMS series, DMS series, HPM series, FMS series, SQO series, AMS series, MCR series, ECMS series, RMS series and the like available from Gelest, Inc.

8. Combined Use of Epoxy Compound

A polymer containing a repeating unit represented by the general formula (1) may be mixed with an epoxy compound and then heated or irradiated with light to be cured thereby serving as a cured membrane, for the purpose of improving the mechanical strength and the plasticization resistance, as the gas separation membranes discussed in Inventions 6 to 9. The cured membrane can be applied to the above-mentioned uniform membrane and asymmetric membrane.

As an epoxy compound, it is possible to cite epoxy compounds obtained by bringing phenol novolac resin, cresol novolac resin, aromatic hydrocarbon formaldehyde resin-modified phenol resin, dicyclopentadiene-modified phenol resin, phenolaralkyl resin, cresolaralkyl resin, naphtholaralkyl resin, biphenyl-modified phenolaralkyl resin, phenol trimethylolmethane resin, tetraphenylolethane resin, naphthol novolac resin, naphthol-phenol co-condensation novolac resin, naphthol-cresol co-condensation novolac resin, biphenyl-modified phenol resin, biphenyl-modified naphthol resins or aminotriazine-modified phenol resin into contact with epichlorohydrin thereby being modified with epoxy group.

These are commercially available and exemplified by a bisphenol A type epoxy resin (available from DIC Corporation under the trade name of Epiclon 840), a bisphenol F type epoxy resin (available from ADEKA Corporation under the trade name of Adekaresin EP-4901), cresol novolac type epoxy resins (available from DIC Corporation under the trade name of Epiclon N-600 series), dicyclopentadiene type resin available from DIC Corporation under the trade name of Epiclon HP-7200 series), triazine type resins (available from Nissan Chemical Industries, Ltd. under the trade name of TEPIC series) and the like.

An epoxy compound represented by general formula (15) is synthesized from a corresponding alcohol and epichlorohydrin.

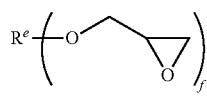
(15)

(In the formula, $R^e$ is an alkyl group or an organic group having a valence of "f" and formed by removing "f" hydrogen atoms from an aromatic or alicyclic ring, and may contain an oxygen atom, sulfur atom or nitrogen atom in its structure, wherein a part of hydrogen atoms may be substituted with fluorine atom, chlorine atom, alkyl group or fluoroalkyl group. "f" is an integer of 1 to 4.)

The alcohol is exemplified by 1,4-cyclohexanediol, 1,3-adamantanediol, catechol, 1,3-benzenediol, 2,2'-dihydroxybiphenyl, 4,4'-dihydroxybiphenyl, 2,2'-methylenediphenol, 4,4'-methylenediphenol, ethylene glycol, propylene glycol, 2,2-bis(4-hydroxyphenyl)-propane, 2,2-bis(4-hydroxyphenyl)-3-methylpropane, 2,2-bis(4-hydroxyphenyl)-butane, 3,3-bis(4-hydroxyphenyl)-pentane, 2,2-bis(4-hydroxyphenyl)-4-methylpentane, 3,3-bis(4-hydroxyphenyl)-hexane, 2,2-bis(3-chloro-4-hydroxyphenyl)-propane, 2,2-bis(3,5-dichloro-4-hydroxyphenyl)-propane, 2,2-bis(3-bromo-4-hydroxyphenyl)-propane, 2,2-bis(3,5-dibromo-4-hydroxyphenyl)-propane, 2,2-bis(3-methyl-4-hydroxyphenyl)-propane, 2,2-bis(4-hydroxyphenyl)-1,1,1,3,3,3-hexafluoropropane, 2,6-dihydroxynaphthalene, 2,3-dihydroxynaphthalene, 2,7-dihydroxynaphthalene, 1,4-dihydroxynaphthalene, 1,5-dihydroxynaphthalene, 2,3-dihydroxypyridine, 2,4-dihydroxypyridine, 4,4'-dihydroxydiphenyl ether, 4,4'-dihydroxydiphenyl sulfide, 4,4'-dihydroxydiphenyl sulfoxide, 4,4'-dihydroxydiphenyl sulfone, 4,4'-dihydroxybenzophenone, 1,4-dihydroxy hexane, 2,2-bis(4-hydroxycyclohexyl)-propane, 1,1'-methylenedi-2-naphthol, 4,4',4''-trihydroxytriphenylmethane, 1,1,1-tris(4-hydroxyphenyl) ethane and α,α,α'-tris(4-hydroxyphenyl)-1-ethyl-4-isopropylbenzene.

As the alcohol, it is also possible to use alcohol of a HFIP group contained in a repeating unit represented by formula (1).

At the time of producing a gas separation membrane of Inventions 6 to 9, these epoxy compounds may be used in combination with a curing agent for epoxy resin. The curing agent is exemplified by amine-based compounds, acid anhydride-based compounds, amide-based compounds, phenol-based compounds, mercaptan-based compounds, imidazole-based compounds, polysulfide resin-based compounds and phosphorous-based compounds. More specifically, it is possible to cite: heat curing agents such as diaminodiphenylmethane, diaminodiphenyl sulfone, diethylenetriamine, triethylenetetramine, polyalkylene glycol polyamine, phthalic anhydride, trimellitic anhydride, pyromellitic anhydride, maleic anhydride, tetrahydrophthalic anhydride, methyltetrahydrophthalic anhydride, methyl nadic anhydride, hexahydrophthalic anhydride, methylhexahydrophthalic anhydride, 2-methylimidazole, triphenyl phosphine, 2-ethyl-4-methylimidazole, $BF_3$ amine complexes and guanidine derivatives; and ultraviolet curing agents such as diphenyliodonium hexafluorophosphate and triphenylsulfonium hexafluorophosphate.

The mixing ratio between a polymer containing a repeating unit represented by general formula (1) and an epoxy compound is a mass ratio (polymer:epoxy compound) of 10:90 to 98:2, preferably 50:50 to 95:5.

The mixing ratio between an epoxy compound and a curing agent for epoxy resin is a mass ratio of 70:30 to 99.5:0.5, preferably 90:10 to 99:1.

At some midpoint in process for producing the gas separation membrane, these may be applied to a glass or silicon substrate and then heated or irradiated with ultraviolet rays (UV) by ultraviolet lamp or the like so as to be cured, thereby producing a gas separation membrane cured by cross-linking. Organic solvents are usable without particular limitation so long as a composition containing polyimide (having a repeating unit represented by general formula (1) and containing a HFIP group and an alkyl group) and an epoxy resin as the primary components can be dissolved therein. Concrete examples are amide-based solvents such as N,N-dimethylformamide, N,N-dimethylacetamide, N-methylformamide, hexamethylphosphoric triamide, N-methyl-2-pyrrolidone and the like, cyclohexanone, propylene glycol monomethyl ether acetate, γ-butyrolactone and the like.

EXAMPLES

Hereinafter the present invention will specifically be explained with reference to examples; however, the present invention is not limited by these examples.

[Preparation of Polyimide Membrane]

Preparation of a polyimide membrane containing a HFIP group and an alkyl group, for use in a gas separation membrane will be discussed.

A 200 mL three-neck flask having a nitrogen-introducing column and a reflux condenser was charged with HFA-2DMeBD as shown below (2.06 g, 3.78 mmol), 6FDA (1.68 g, 3.78 mmol) and N,N-dimethylacetamide (14 g) and then stirred in an atmosphere of nitrogen at room temperature for 18 hours. Thereafter, pyridine (0.6 g, 8.32 mmol) and acetic anhydride (0.77 g, 7.56 mmol) were added thereto and then stirred at room temperature for 3 hours. A thus obtained reaction liquid was increased in temperature to 200° C. and then stirred for 6 hours, followed by being cooled to room temperature, thereby obtaining a uniform N,N-dimethylacetamide solution in which Polyimide 1 was dissolved. The Mw value of Polyimide 1, calculated by measuring the solution by GPC (gel permeation chromatography) was 42,000 (where an apparatus available from TOSOH CORPORATION under the trade name of HLC-8320 was used, a solvent was tetrahydrofuran, and conversion was conducted with respect to polystyrene standard. The same applied to the following Examples).

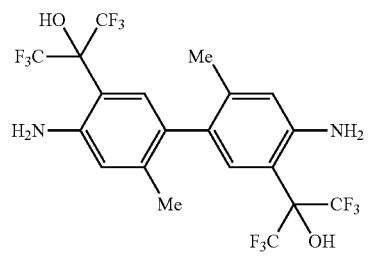

HFA-2DMeBD

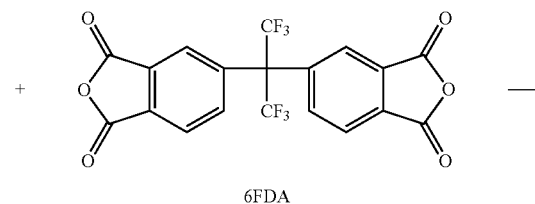

6FDA

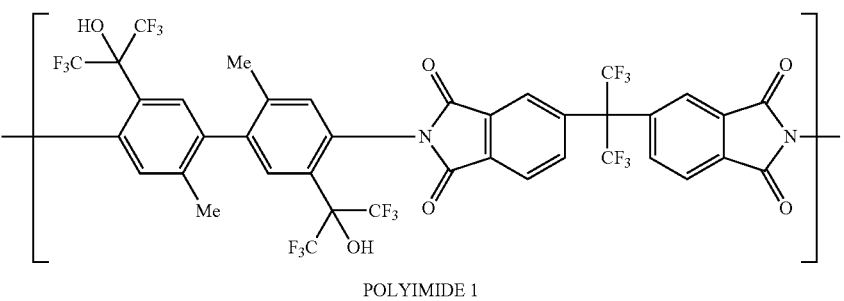

POLYIMIDE 1

(In the formula, "Me" represents a methyl group. The same applies to the following in this specification.)

The N,N-dimethylacetamide solution was applied onto a glass substrate, followed by spin coating by using a spin coater under the application condition of a rotation speed of 1000 rpm and 30 seconds of retention time. A thus obtained glass substrate was heat-treated in an atmosphere of nitrogen at 200° C. for 1 hour and then a membrane was peeled from the glass substrate, thereby obtaining a membrane formed from Polyimide 1, i.e., a membrane of Polyimide 1 containing a HFIP group and an alkyl group (hereinafter, sometimes referred to as "Polyimide Membrane 1"). As a result of measuring the membrane thickness, it was confirmed to be 25 μm.

Then, a series of diamine compounds containing a HFIP group and an alkyl group (HFA-2DMeBD, HFA-MeFL, HFA-3DMeBD, mHFA-3DMeBD) as follows:

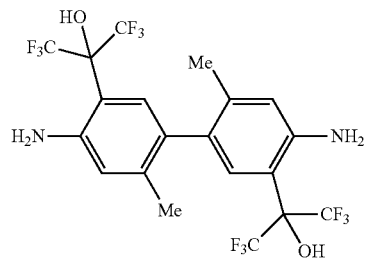

HFA-2DMeBD

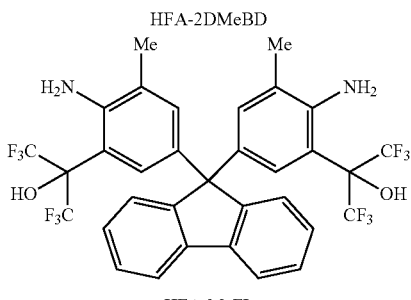

HFA-MeFL

-continued

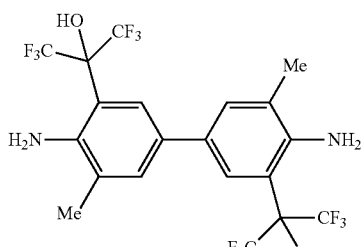

HFA-3DMeBD

-continued

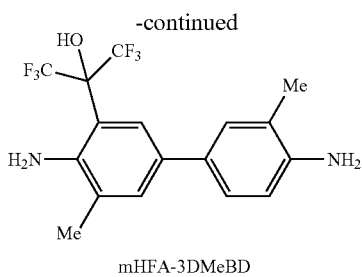

mHFA-3DMeBD were reacted with tetracarboxylic dianhydrides (PMDA, BPDA, BTDA, DSDA, ODPA, 6FDA) as follows:

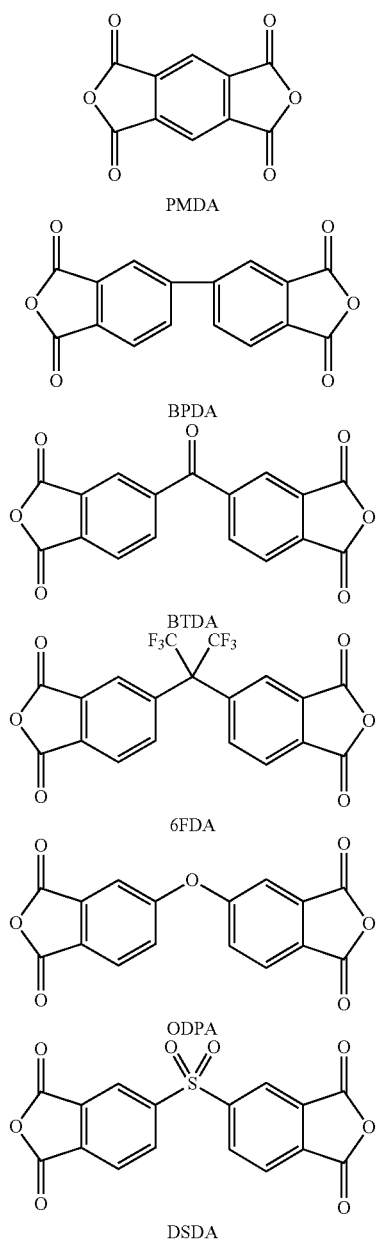

and then the above-mentioned procedures were repeated, thereby obtaining polyimide membranes formed from Polyimides 2 to 17 (Polyimide Membranes 2 to 17). The substrate compounds and the membrane thicknesses for Polyimide Membranes 2 to 17 are shown in Table 1-1 and the Mw values of Polyimide Membranes 2 to 17 are shown in Table 1-2.

TABLE 1-1

| Polyimide Membrane | Diamine Compound | Tetracarboxylic Dianhydride | Membrane Thickness |
|---|---|---|---|
| Polyimide 2 | HFA-2DMeBD | DSDA | 30 μm |
| Polyimide 3 | HFA-2DMeBD | ODPA | 26 μm |
| Polyimide 4 | HFA-2DMeBD | PMDA | 45 μm |
| Polyimide 5 | HFA-2DMeBD | BTDA | 28 μm |
| Polyimide 6 | HFA-2DMeBD | BPDA | 23 μm |
| Polyimide 7 | HFA-2DMeBD | ODPA/BPDA (1/1) | 26 μm |
| Polyimide 8 | HFA-2DMeBD/HFA-MeFL (1/2) | 6FDA | 32 μm |
| Polyimide 9 | HFA-2DMeBD/HFA-MeFL (1/1) | ODPA | 35 μm |
| Polyimide 10 | HFA-2DMeBD/HFA-MeFL (2/1) | BPDA | 28 μm |
| Polyimide 11 | HFA-2DMeBD/ HFA-3DMeBD (2/1) | 6FDA | 27 μm |
| Polyimide 12 | HFA-2DMeBD/ HFA-3DMeBD (1/1) | ODPA | 30 μm |
| Polyimide 13 | HFA-2DMeBD/ HFA-3DMeBD (1/1) | 6FDA | 32 μm |
| Polyimide 14 | HFA-2DMeBD/ HFA-3DMeBD (2/1) | ODPA/BPDA (2/1) | 28 μm |
| Polyimide 15 | HFA-3DMeBD/ mHFA-3DMeBD (2/1) | BTDA | 27 μm |
| Polyimide 16 | HFA-3DMeBD/ mHFA-3DMeBD (2/1) | 6FDA | 25 μm |
| Polyimide 17 | HFA-3DMeBD/ mHFA-3DMeBD (2/1) | BPDA | 30 μm |

Note:
A parenthesized number in this table represents a mole ratio at the time of charging, between two diamine compounds or between two tetracarboxylic dianhydrides.

TABLE 1-2

| Polyimide | Mw |
|---|---|
| Polyimide 2 | 27,000 |
| Polyimide 3 | 47,000 |
| Polyimide 4 | 70,000 |
| Polyimide 5 | 51,000 |
| Polyimide 6 | 98,000 |
| Polyimide 7 | 68,000 |
| Polyimide 8 | 40,000 |
| Polyimide 9 | 29,000 |
| Polyimide 10 | 35,000 |
| Polyimide 11 | 41,000 |
| Polyimide 12 | 38,000 |
| Polyimide 13 | 39,000 |
| Polyimide 14 | 51,000 |
| Polyimide 15 | 42,000 |
| Polyimide 16 | 40,000 |
| Polyimide 17 | 55,000 |

Then, a series of diamine compounds containing a HFIP group and an alkyl group (HFA-2DMeBD, HFA-MeFL, HFA-3DMeBD) and a series of tetracarboxylic dianhydrides (6FDA, BPDA, BTDA, DSDA) were combined and polymerized. To a DMAc solution obtained after the reaction, Epoxy Resin 1 or 2 and triphenyl phosphine as a curing agent (in an amount of 1 mass % relative to epoxy resin) were added in certain amounts to produce polyimide of each Example. The polyimides were formed into membranes thereby obtaining Polyimide Membranes 18 to 23. The substrate compounds of Polyimide Membranes 18 to 23 are shown in Table 2, as well as their membrane thicknesses.

Epoxy Resin 1: Bisphenol A type epoxy resin (available from Mitsubishi Chemical Corporation under the trade name of JER828)

Epoxy Resin 2: Cresol novolac epoxy resin (available from Sigma-Aldrich, Catalog No. 408042)

TABLE 2

| Polyimide Membrane | Diamine Compound | Tetracarboxylic Dinhydride | Epoxy Resin | Membrane Thickness |
|---|---|---|---|---|
| Polyimide 18 | HFA-2DMeBD | BTDA | Epoxy Resin 1 (10) | 25 μm |
| Polyimide 19 | HFA-2DMeBD | 6FDA | Epoxy Resin 2 (10) | 35 μm |
| Polyimide 20 | HFA-MeFL | BPDA | Epoxy Resin 1 (10) | 23 μm |
| Polyimide 21 | HFA-MeFL | 6FDA | Epoxy Resin 2 (10) | 35 μm |
| Polyimide 22 | HFA-3DMeBD | DSDA | Epoxy Resin 1 (20) | 30 μm |
| Polyimide 23 | HFA-3DMeBD | 6FDA | Epoxy Resin 2 (10) | 28 μm |

Note:
A parenthesized number in this table represents the mass of epoxy resin relative to the total mass (regarded as 100) of diamine compound and tetracarboxylic dianhydride.

[Evaluation of Polyimide 5]

On Polyimide 5, measurement of the gas permeability coefficient and evaluation of the separation performance were conducted. A method of measuring the gas permeability coefficient of a gas separation membrane will be discussed below.

The gas permeability coefficient was measured upon disposing a gas separation membrane having a membrane area of 7 $cm^2$ on a cell formed of stainless steel, according to a differential-pressure method discussed in Part 1 of Japanese Industrial Standard JIS K 7126-1 (2006) "Plastics—Film and sheeting—Determination of gas-permeation rate".

More specifically, helium (He), carbonic acid gas ($CO_2$), oxygen gas ($O_2$) and methane gas ($CH_4$) were used as sample gases under a condition of a temperature of 23° C. thereby measuring the permeability coefficient and the separation performance (a ratio among the permeability coefficients of each of the gases) of each of the gases according to JIS K 7126-1 (2006).

A result of measuring the gas permeability coefficient of a membrane formed from Polyimide 5 according to the above-mentioned JIS K 7126-1 (2006) is shown in Table 3, and a result of evaluating the separation performance is shown in Table 4.

In the same manner, results of measuring the gas permeability coefficients of a membrane formed from Polyimide 6 and a membrane formed from Polyimide 8 according to the above-mentioned JIS K 7126-1 (2006) are also shown in Table 3, and results of evaluating their separation performances are also shown in Table 4.

TABLE 3

Result of Measuring Gas Permeability Coefficient

| | Permeability Coefficient (unit: Barrer) (1 Barrer = $10^{-10}$ $cm^3$ (STP) cm/$cm^2$ sec cmHg) | | | |
|---|---|---|---|---|
| | He | $CO_2$ | $O_2$ | $CH_4$ |
| Polyimide Membrane 5 | 371 | 347 | 69 | 9.2 |
| Polyimide Membrane 6 | 910 | 820 | 150 | 28 |
| Polyimide Membrane 8 | 505 | 310 | 100 | 12 |

TABLE 4

Result of Evaluating Separation Performance

| | Separation Performance (unit: none) | |
|---|---|---|
| | $CO_2/CH_4$ | $He/CH_4$ |
| Polyimide Membrane 5 | 38 | 40 |
| Polyimide Membrane 6 | 29 | 32 |
| Polyimide Membrane 8 | 26 | 42 |

Then, a comparison of gas separation performance was made among the above-mentioned polyimide membranes containing a HFIP group and an alkyl group (Polyimide Membranes 5, 6 and 8) and conventional polyimide membranes not containing a HFIP group, the conventional ones being out of the scope of the present invention and represented by the following structural formula (Comparative Examples 1 and 2).

Comparative Example 1

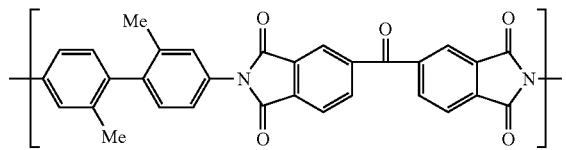

Polyimide Membrane of Comparative Example 1

The $CO_2$ permeability coefficient of a polyimide membrane of Comparative Example 1 not containing a HFIP group was 5 Barrer, while that of a polyimide membrane formed from Polyimide 5 of the present invention containing a HFIP group and an alkyl group was 347 Barrer as shown in Table 3. It is evident from these results that the $CO_2$ permeability coefficient is increased by the introduction of a HFIP group thereby exhibiting greater performances.

Comparative Example 2

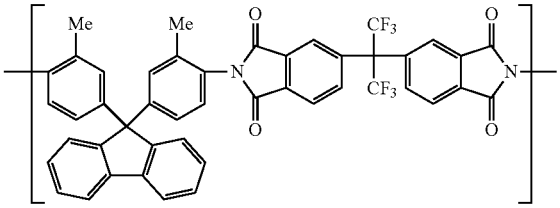

Polyimide Membrane of Comparative Example 2

The $CO_2$ permeability coefficient of a polyimide membrane of Comparative Example 1 not containing a HFIP group was 12 Barrer, while that of a polyimide membrane formed from Polyimide 8 of the present invention containing a HFIP group and an alkyl group was 310 Barrer as shown in Table 3. It is evident from these results that the $CO_2$ permeability coefficient is increased by the introduction of a HFIP group thereby exhibiting greater performances.

Furthermore, in any of Polyimide Membranes 1 to 4, 7 and 9 to 23 according to the present invention, the $CO_2$ permeability coefficient was so high as to be 50 Barrer or more, with which these were confirmed to be superior in performances to polyimide membranes of Comparative Examples 1 and 2.

INDUSTRIAL APPLICABILITY

A gas separation membrane foamed from a polyimide membrane containing a HFIP group and an alkyl group of the present invention has a permeation rate (a gas permeability coefficient) which dramatically varies according to the kind of gas, and excellent in gas separation performance. Hence the membrane can be preferably applied to a technique of separating carbon dioxide from liquefied natural gas and the like and fixing it, and preferably used as a water/ethanol separation membrane provided for the purpose of recovering a fuel-use ethanol, or the like.

The invention claimed is:

1. A gas separation membrane, comprising:
   a polyimide structure that contains a repeating unit represented by general formula (1):

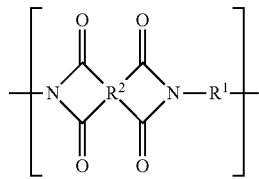
(1)

wherein $R^1$ is a divalent organic group and $R^2$ is a tetravalent organic group;

wherein $R^1$ is a divalent organic group represented by general formula (2):

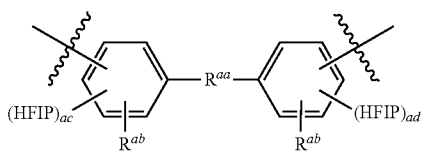
(2)

wherein $R^{aa}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon; wherein $R^{ab}$ is a $C_1$-$C_6$ alkyl group; wherein "ac" and "ad" mutually independently represent an integer of 0 to 2 such that $1 \leq ac+ad \leq 4$; wherein HFIP represents a —$C(CF_3)_2OH$ group; and wherein a straight line that intersects with a wiggly line represents a bonding moiety.

2. A gas separation membrane as claimed in claim 1, wherein the divalent organic group represented by general formula (2) is a divalent organic group represented by general formula (3):

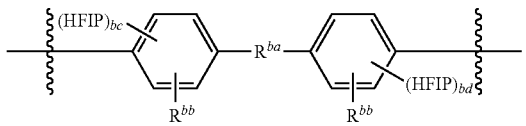
(3)

wherein $R^{ba}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon; wherein $R^{bb}$ is a $C_1$-$C_6$ alkyl group; wherein "bc" and "bd" mutually independently represent an integer of 0 to 2 such that $1 \leq bc+bd \leq 4$; wherein HFIP represents a —$C(CF_3)_2OH$ group; and wherein a straight line that intersects with a wiggly line represents a bonding moiety.

3. A gas separation membrane as claimed in claim 1, wherein the divalent organic group represented by general formula (2) is any one of divalent organic groups represented by general formulas (4) and (5):

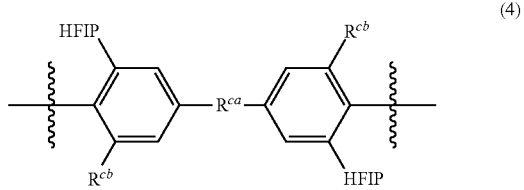
(4)

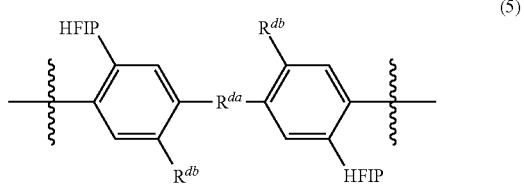
(5)

wherein $R^{ca}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon; wherein $R^{cb}$ is a $C_1$-$C_6$ alkyl group; wherein HFIP represents a —$C(CF_3)_2OH$ group; wherein $R^{da}$ is a single bond, an oxygen atom, a sulfur atom, —$SO_2$— group, —$CH_2$— group, —C(=O)— group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon; wherein $R^{db}$ is a $C_1$-$C_6$ alkyl group; wherein HFIP represents a —$C(CF_3)_2OH$ group; and wherein a straight line that intersects with a wiggly line represents a bonding moiety.

4. A gas separation membrane as claimed in claim 1, wherein the divalent organic group represented by general formula (2) is any one of divalent organic groups represented by formulas (6) to (8):

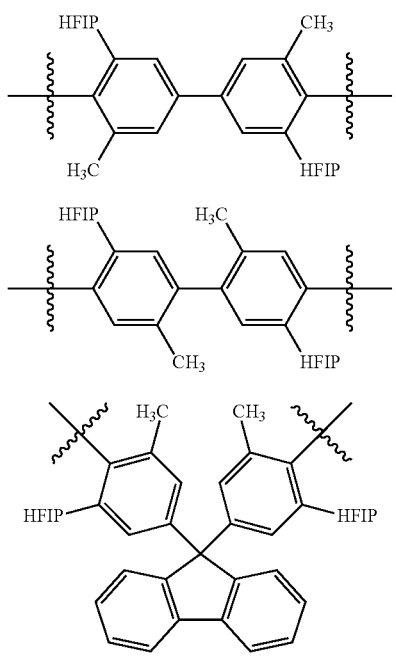

(6)

(7)

(8)

wherein HFIP represents a —C(CF$_3$)$_2$OH group; and wherein a straight line that intersects with a wiggly line represents a bonding moiety.

5. A gas separation membrane comprising a polyimide structure, as claimed in claim 1, wherein R$^2$ is any one of tetravalent organic groups represented by formulas (9) to (14):

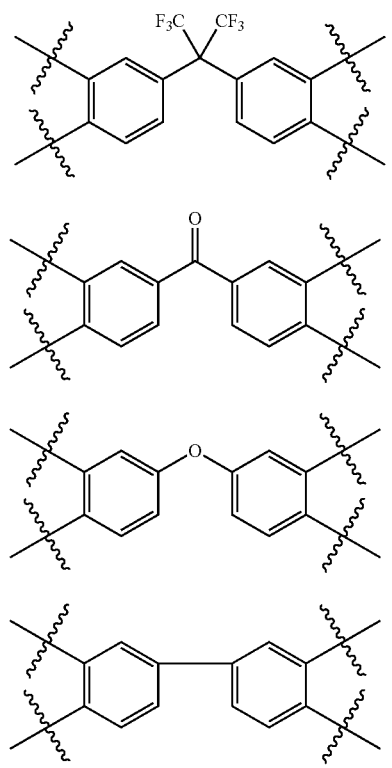

(9)

(10)

(11)

(12)

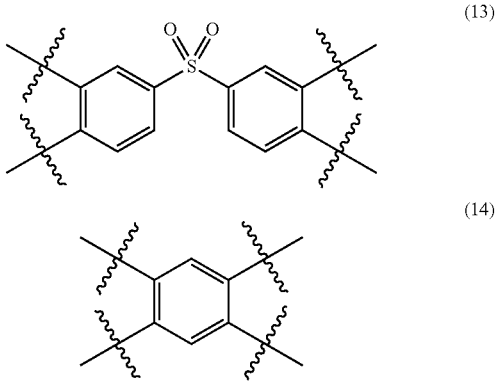

(13)

(14)

wherein a straight line that intersects with a wiggly line represents a bonding moiety.

6. A gas separation membrane comprising a polyimide structure, as claimed in claim 1, wherein a hydrogen atom of —OH group that a HFIP group contained in R$^1$ has is substituted with a glycidyl group.

7. A gas separation membrane as claimed in claim 6, wherein the glycidyl group forms crosslinking in a manner that its cyclic ether moiety is opened.

8. A gas separation membrane as claimed in claim 1, obtained by being mixed with an epoxy compound and then heated.

9. A gas separation membrane as claimed in claim 8, wherein the epoxy compound is represented by general formula (15):

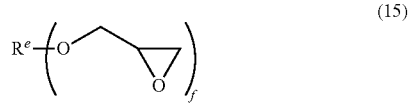

(15)

wherein R$^e$ is an organic group having a valence of "f" and formed by removing any "f" hydrogen atoms from an alkane, aromatic compound or alicyclic compound, and may contain an oxygen atom, sulfur atom or nitrogen atom in its structure, wherein a part of hydrogen atoms may be substituted with fluorine atom, chlorine atom, alkyl group or fluoroalkyl group; and wherein "f" is an integer of 1 to 4.

10. A polyimide comprising:
a repeating unit represented by general formula (1):

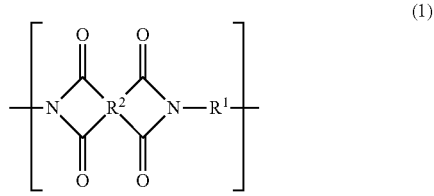

(1)

wherein R$^1$ is a divalent organic group and R$^2$ is a tetravalent organic group;
wherein R$^1$ is a divalent organic group represented by general formula (2):

(2)

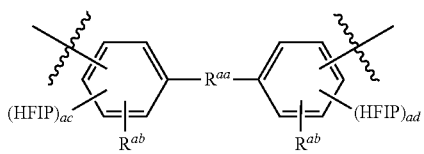

wherein $R^{aa}$ is a single bond, an oxygen atom, a sulfur atom, —$SO_2$— group, —$CH_2$— group, group, —$C(CH_3)_2$— group, —$C(CH_3)(CH_2CH_3)$— group, —$C(CF_3)_2$— group or a divalent organic group formed by removing any two hydrogen atoms from a $C_3$-$C_{12}$ alicyclic hydrocarbon or $C_6$-$C_{25}$ aromatic hydrocarbon; wherein $R^{ab}$ is a $C_1$-$C_6$ alkyl group; wherein "ac" and "ad" mutually independently represent an integer of 0 to 2 such that 1≤ac+ad≤4; wherein HFIP represents a —$C(CF_3)_2OH$ group; wherein a straight line that intersects with a wiggly line represents a bonding moiety; and wherein a hydrogen atom of —OH group that a HFIP group contained in $R^1$ has is substituted with a glycidyl group.

11. A cured product comprising:
a polyimide having a glycidyl group, as claimed in claim 10, wherein the glycidyl group forms crosslinking in a manner that its cyclic ether moiety is opened.

12. A cured product comprising:
a polyimide as claimed in claim 10; and
an epoxy compound,
wherein the cured product is obtained by mixing the polyimide with the epoxy compound and then by heating it.

13. A cured product as claimed in claim 12, wherein the epoxy compound is represented by general formula (15):

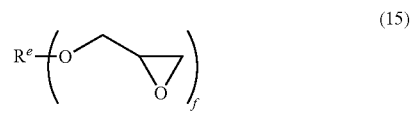

(15)

wherein $R^e$ is an organic group having a valence of "f" and formed by removing any "f" hydrogen atoms from an alkane, aromatic compound or alicyclic compound, and may contain an oxygen atom, sulfur atom or nitrogen atom in its structure, wherein a part of hydrogen atoms may be substituted with fluorine atom, chlorine atom, alkyl group or fluoroalkyl group; and wherein "f" is an integer of 1 to 4.

* * * * *